(12) United States Patent
Bose et al.

(10) Patent No.: US 7,501,050 B2
(45) Date of Patent: Mar. 10, 2009

(54) METHOD OF MAKING METAL-COATED CARBON SURFACES FOR USE IN FUEL CELLS

(75) Inventors: Rathindra N. Bose, DeKalb, IL (US); Anima B. Bose, DeKalb, IL (US)

(73) Assignee: Northern Illinois University, DeKalb, IL (US)

( * ) Notice: Subject to any disclaimer, the term of this patent is extended or adjusted under 35 U.S.C. 154(b) by 234 days.

(21) Appl. No.: 10/539,024

(22) PCT Filed: Dec. 30, 2003

(86) PCT No.: PCT/US03/41521

§ 371 (c)(1),
(2), (4) Date: Oct. 11, 2005

(87) PCT Pub. No.: WO2004/061163

PCT Pub. Date: Jul. 22, 2004

(65) Prior Publication Data

US 2006/0234039 A1    Oct. 19, 2006

Related U.S. Application Data

(60) Provisional application No. 60/437,391, filed on Dec. 31, 2002.

(51) Int. Cl.
*C25D 5/18* (2006.01)
*C25D 3/50* (2006.01)

(52) U.S. Cl. .................. 205/105; 205/103; 205/264

(58) Field of Classification Search .............. 205/103, 205/105, 264

See application file for complete search history.

(56) References Cited

U.S. PATENT DOCUMENTS 5,084,144 A * 1/1992 Reddy et al. ............... 205/104
5,284,571 A * 2/1994 Verbrugge .................. 205/118
5,501,915 A * 3/1996 Hards et al. ................. 429/42

OTHER PUBLICATIONS

Bose, N. Rathindra, et al., "Phosphorus-31 NMR and Kinetic Studies of the Formation of Ortho- Pyro-, and Triphosphato Complexes of cis-Dichlorodiammineplatinum (II)," *American Chemical Society*, vol. 106, No. 11, 3336-3343 (1984).
Bose, N. Rathindra, et al., "Kinetics and Mechanisms of Platinum(II)-Promoted Hydrolysis of Inorganic Polyphosphates," *Inorganic Chemistry*, vol. 24, No. 24, 3989-3996 (1985).
Ellis, Michael W. et al., "Fuel Cell Systems: Efficient, Flexible Energy Conversion for the 21st Century," *Proceedings of the IEEE*, vol. 89, No. 12, 1808-1818 (2001).
Hangerstein-Kozlowska, et al., "Electrochemisorption and Reactivity of Nitriles at Platinum Electrodes and the Andoc H Desorption Effect," *Electroanalytical Chemistry and Interfacial Electrochemistry*, 287-313 (1972).
2001 Annual Progress Report, "Fuel Cells for Transportation," U.S. Department of Energy, Energy Efficiency and Renewable Energy Office of Transportation Technologies.

* cited by examiner

*Primary Examiner*—Susy N Tsang-Foster
*Assistant Examiner*—William T Leader
(74) *Attorney, Agent, or Firm*—Kohn & Associates PLLC

(57) ABSTRACT

A method of coating a carbon article with a metal by cyclic voltammetrically electrodepositing the metal on the carbon article, thereby forming a metal coating on the carbon article and the metal-coated carbon article made by the method. A metal-coated carbon article having a carbon article and a metal coating disposed on an exterior surface of the carbon article, the coating being present in an amount less than about $0.1\ mg/cm^2$.

3 Claims, 4 Drawing Sheets

Cyclic voltammograms of platinum phosphate blue recorded by using a porous carbon, SCE, and Pt wire as working, reference, and auxiliary electrodes. The successive scanning of potential afforded a uniform coating of platinum on to the carbon surface.

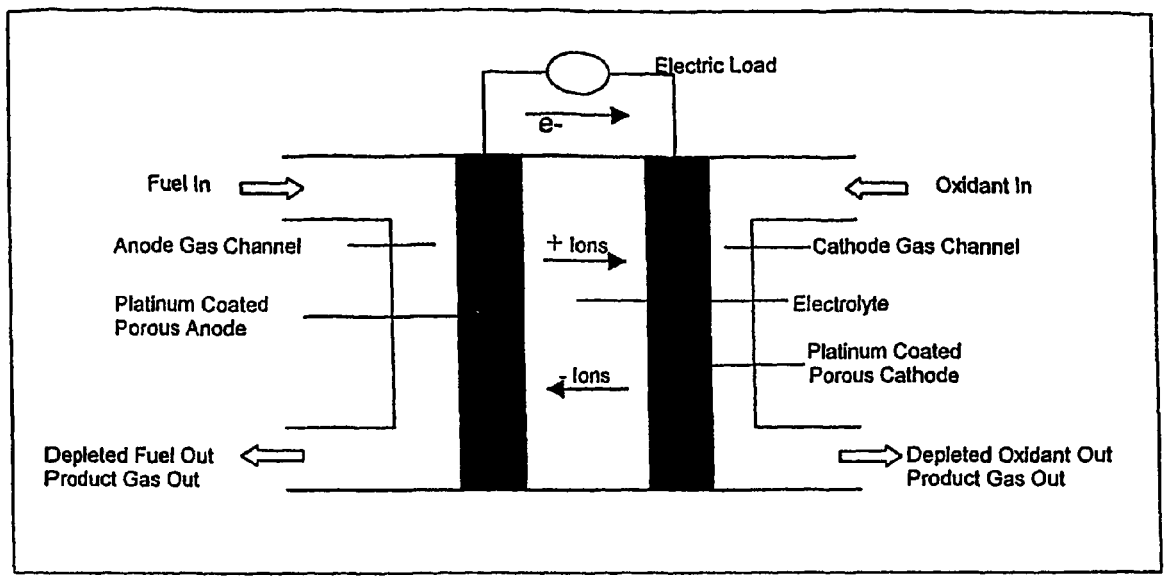
Figure 1: Schematic diagram of a fuel cell.

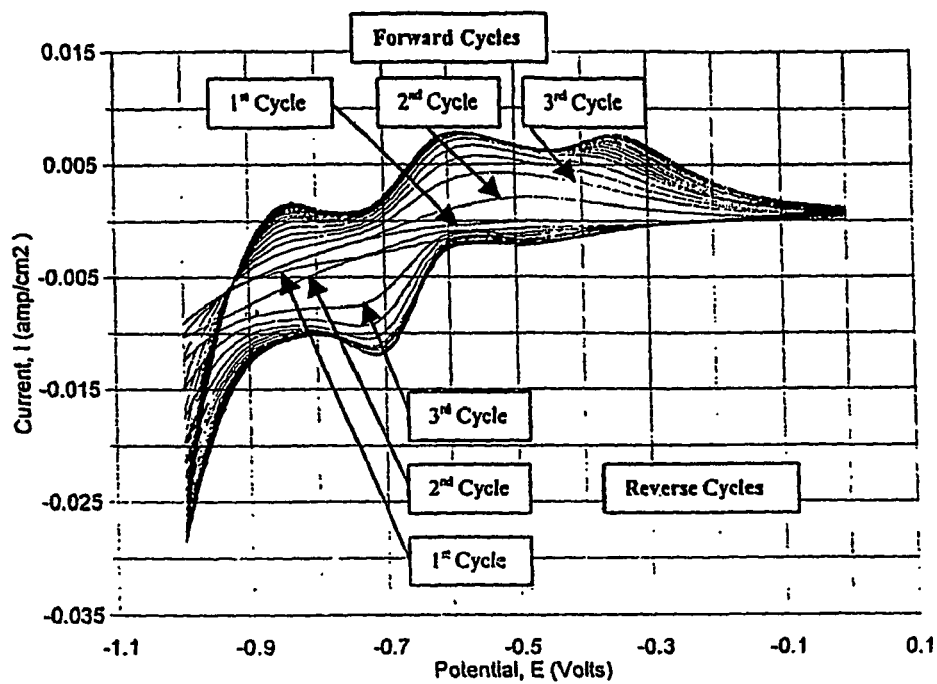
Figure 2: Cyclic voltammograms of platinum phosphate blue recorded by using a porous carbon, SCE, and Pt wire as working, reference, and auxiliary electrodes. The successive scanning of potential afforded a uniform coating of platinum on to the carbon surface.

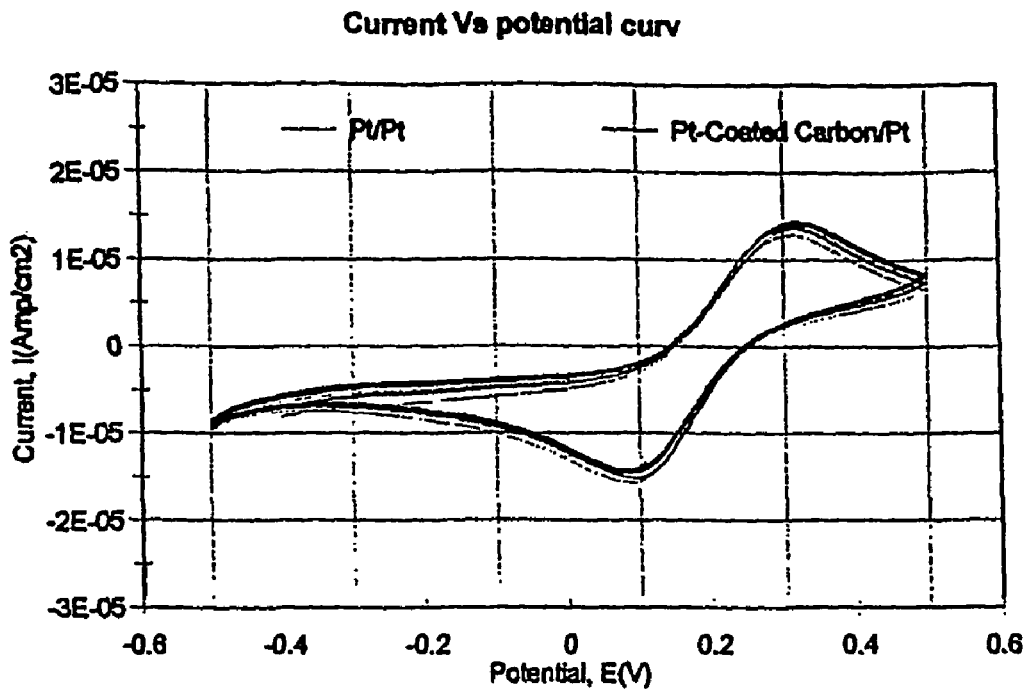

Figure 3: Cyclic voltammograms of $K_3Fe(CN)_6$ recorded by utilizing Platinum wire(red) and platinum coated carbon(black) electrodes. The reference and auxiliary electrodes are the same in both cases. Note that the surface areas of the two working electrodes are adjusted to be the same. The outputs currents are indeed comparable indicating that the platinum coated carbon electrode behaves exactly like a genuine platinum electrode.

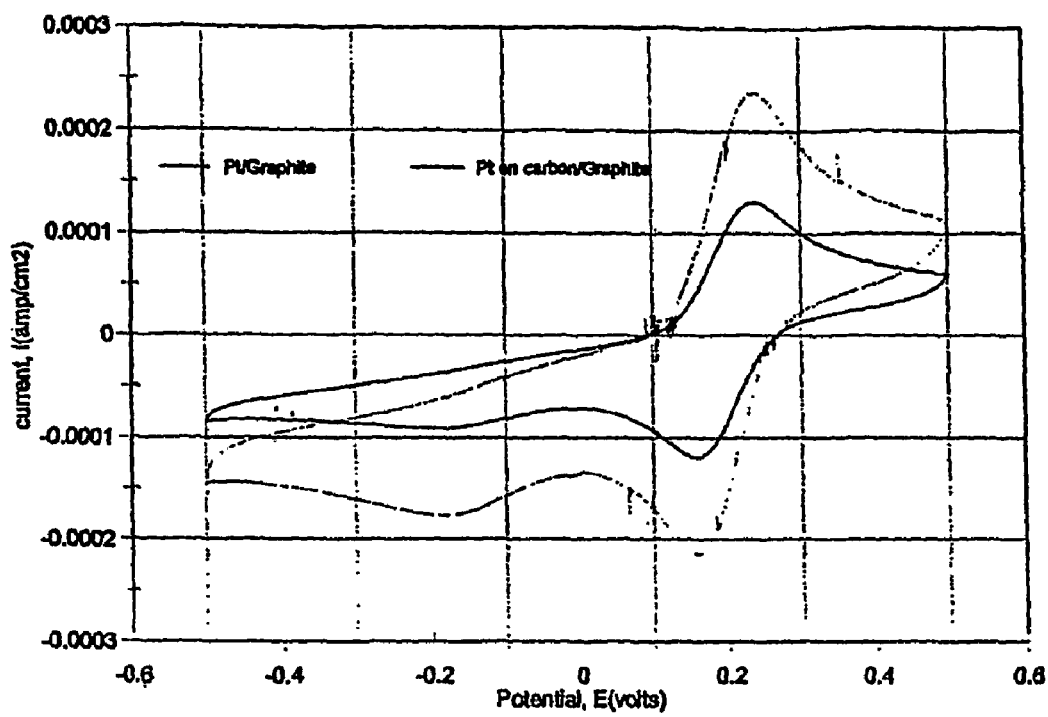
Figure 4. Cyclic voltammograms of $K_3Fe(CN)_6$ recorded by utilizing platinum coated carbon electrode (red) and pure platinum wire (black) as working electrode demonstrating that platinum coated carbon electrode behaves like an authentic platinum electrode.

METHOD OF MAKING METAL-COATED CARBON SURFACES FOR USE IN FUEL CELLS

CROSS-REFERENCE TO RELATED APPLICATIONS

This patent application is a National Stage Entry Under 35 U.S.C. 371, of PCT Application No. PCT/US03/41521, filed Dec. 30, 2003, which claims the benefit of priority of U.S. Provisional Patent Application Ser. No. 60/437,391, filed Dec. 31, 2002, both of which are incorporated herein by reference.

BACKGROUND OF THE INVENTION

1. Field of the Invention

Generally, the present invention relates to a metal-coated carbon article. More specifically, the present invention relates to a platinum coated carbon fuel cell electrode.

2. Description of the Related Art

A fuel cell is an electrochemical device in which electrical energy is generated by a chemical reaction without altering the basic components of the fuel cell, i.e., the electrodes and the electrolyte. Fuel cells combine hydrogen and oxygen without combustion to form water, and also produce direct current electric power. The process can be described as electrolysis in reverse. The fuel cell is unique in that it converts chemical energy continuously into electrical energy without an intermediate conversion to heat energy.

Fuel cells have been pursued as a source of power for transportation because of their high-energy efficiency (unmatched by heat engine cycles), their potential for fuel flexibility, and their extremely low emissions. Fuel cells have potential for stationary and vehicular power applications. The commercial viability of fuel cells for power generation in stationary and transportation applications depends upon solving a number of manufacturing, cost, and durability problems.

The operation of a fuel cell involves supplying fuel to an anode, where the fuel is ionized to free electrons and hydrogen ions. The free electrons flow through an external circuit to the cathode. The free hydrogen ions pass through the electrolyte to the cathode, which is supplied with oxygen. The oxygen at the cathode is ionized by the electrons, which flow into the cathode from the external circuit connected to the anode. The ionized oxygen and hydrogen ions react to form water.

Fuel cells are broadly classified by operating temperature level, type of electrolyte, and type of fuel. Low-temperature fuel cells (less than 150° C./302° F.) require a catalyst in order to increase the rate of reaction to a level that is high enough for practical use. Electrodes for low temperature fuel cells usually are porous and impregnated with the catalyst.

Among the several types of fuel cells under development to provide efficient sources of electrical power with reduced pollution, cells using gas diffusion electrodes (GDEs) with proton exchange membranes as the electrolyte (proton exchange membrane fuel cells, PEMFCs) are seen as having a number of advantages. Such fuel cells avoid the problems of handling liquid fuels and electrolytes because they use gaseous reactants and a solid electrolyte that allows the transfer of protons between electrodes. Although phosphoric acid fuel cells (PFC) utilize phosphoric acid as the electrolyte, the same catalyst loaded electrodes described above are required for their functions. The cells have been found to be reliable, efficient, and convenient sources of power. However, they have proven to be very expensive in terms of cost per kilowatt of power delivered. As a consequence, their practical application has been limited to specialized applications that can justify their considerable expense, e.g., in aerospace applications. If such fuel cells are to achieve wider application, for example, as sources of power for automotive propulsion or stationary power plants, the cost in terms of dollars per delivered kilowatt will have to be significantly reduced.

Further, low temperature fuel cells cannot be used successfully for vehicular propulsion unless the fuel cells have a very large electrode area coated with a catalytically active material. The noble metal catalysts used in low temperature fuel cells generally perform most efficiently if they are in small clusters of nanometric dimensions on a suitable support. The support material must be: (a) electrically conductive; (b) chemically inert in the fuel cell environment; (c) mechanically robust; (d) sufficiently adherent to the cell membrane; and, (e) depositable in a thin film form, into which platinum, or other catalyst material, can be incorporated.

A major factor in the cost of PEMFCs and PFC is the expense of the electrodes. The cost of the electrodes is determined by a number of factors, primarily the expense of the precious metal catalysts, which are needed for practical efficiency, and the cost of fabricating the electrodes, which is typically conducted by means of a batch process. Furthermore, the cost of the fuel cell system is also greatly affected by the electrochemical performance of the electrodes, which determines the power density of the fuel cell, i.e., the power produced per unit area, e.g., kilowatts per square centimeter. The combination of power density, catalyst loading, and system fabrication costs determines the ultimate cost per kilowatt of the complete fuel cell system.

A favored material for use as an electrode support material is carbon. The carbon typically is "doped" with 1-10% platinum or platinum-ruthenium. In the past, the catalyst-doped carbon has been applied in the form of ink. Alternatively, the catalyst-doped carbon can be applied using complex chemical processes that require high temperature firing, resulting in a glassy carbon that contains platinum oxide. The high temperature firing used to produce these electrodes, cannot be used to coat the ionomer membranes that are favored for use in polymer electrolyte fuel cells (PEFC's).

Some of the most efficient electrocatalysts for- low temperature fuel cells are noble metals, such as platinum, which are very expensive. It has been estimated that the total cost of such catalysts comprises a significant percentage of the total cost of manufacturing a low-temperature fuel cell. The expense of such catalysts makes it imperative to reduce the amount, or loading, of catalyst required for the fuel cell. This requires an efficient method for applying the catalyst. The method also must produce an electrocatalytic coating with a minimal catalyst load that also has sufficient catalytic activity for commercial viability.

Conventional fuel cell electrodes have used unsupported platinum black, having a surface area of about 28 $m^2/g$ with a particle size of about 10 nanometers, at a catalyst loading of about 4 $mg/cm^2$ of electrode area. It is estimated that the amount of precious metal will have to be reduced substantially below 1 $mg/cm^2$ if PEMFCs are to become a widely used source of electric power.

In a typical process, an amount of a desired noble metal catalyst, in the range of about 0.5-4 $mg/cm^2$, is applied to a fuel cell electrode as an ink or using complex chemical procedures. Unfortunately, such methods require the application of a relatively large load of noble metal catalyst in order to produce a fuel cell electrode with the desired level of electrocatalytic activity, particularly for low temperature applications. The expense of such catalysts makes it imperative to reduce the amount, or loading, of catalyst required for the fuel cell. There is therefore a need in the art for a more efficient method for applying the catalyst.

In recent years, a number of deposition methods, including rolling/spraying, solution casting/hot pressing, and electrochemical catalyzation, have been developed for the production of platinum catalyst layers for proton exchange membrane (PEM) fuel cells. Although thin sputtered platinum coatings deposited on carbon cloth can measurably improve fuel cell performance, this approach generally is not considered to be viable for large area deposition or as a stand-alone treatment for applying platinum. Continuing challenges remain in the development of scalable methods for the production of large-area (>300 $cm^2$), high performance (>1 $A/cm^2$ at 0.6 V) fuel cell electrodes with low platinum loadings (<0.3 $mg/cm^2$).

Additionally, it has been recognized that the amount of precious metal catalyst can be reduced if the metal is present in a more finely divided form. Consequently, electrodes using platinum supported on a granular support, e.g., carbon particles, have been used. Such supported platinum catalysts, prepared by chemical precipitation of the metal onto the granular support, typically have surface areas of about 120 $m^2/g$, with a particle size of about 2-2.5. nanometers, and a catalyst loading of about 0.5 $mg/cm^2$. Although these electrodes use less of the costly platinum catalyst, the power density obtained using such electrodes has been less than satisfactory. Accordingly, the cost of such a fuel cell system is still too high. It is believed that the relatively poor performance, i.e., low power density, is caused by ineffective utilization of the catalyst, because a substantial fraction of the platinum is not accessible to the reagents.

A method for depositing precious metal catalyst in finely divided form in a gas diffusion electrode is disclosed in U.S. Pat. No. 5,084,144, to Vilambi-Reddy et al. According to the method of the '144 patent, fine particles of a catalytic metal are deposited electrolytically onto an uncatalyzed layer of carbon particles, bonded with a fluorocarbon resin, and impregnated with the proton exchange resin by contacting the face of the electrode with a plating bath and using pulsed direct current. The gas diffusion electrodes prepared by the process of the '144 patent contained about 0.05 $mg/cm^2$ of platinum as particles of about 3.5 nanometers in diameter having a surface area of about 80 $m^2/g$. Such electrodes functioned about as well as the electrodes using supported platinum with a loading of 0.5 $mg/cm^2$ of platinum. It is believed that these electrodes achieved their improved mass activity, i.e., current per weight of platinum, because the electrolytic process deposits the catalyst particles only at regions with both electronic and ionic accessibility. Such locations are expected to be accessible to the protons and electrons required for the fuel cell reactions. However, such improved mass activity does not compensate for the low catalyst loading provided by the process disclosed in the '144 patent. Consequently, the power density of such electrodes is still insufficient to permit the wide use of PEMFCs as sources of electric power.

It would, therefore, be useful to develop a method of depositing catalytic metals on carbon articles in amounts greater than hitherto achieved, while retaining the small particle size, and electronic and ionic accessibility that provides high mass activity.

SUMMARY OF THE INVENTION

According to the present invention, there is provided a method of coating a carbon article with a metal by cyclic voltammetrically electrodepositing the metal on the carbon article, thereby forming a metal coating on the carbon article. Also provided is the metal-coated carbon article made by the above method. A metal-coated carbon article having a carbon article and a metal coating disposed on an exterior surface of the carbon article, the coating being present in an amount less than about 0.2 $mg/cm^2$ is also provided.

DESCRIPTION OF THE DRAWINGS

Other advantages of the present invention are readily appreciated as. the same becomes better understood by reference to the following detailed description, when considered in connection with the accompanying drawings wherein:

FIG. 1 is a schematic diagram of a prior art fuel cell;

FIG. 2 is a graph showing cyclic voltammograms of platinum phosphate blue recorded using a porous carbon, SCE, and Pt wire as working, reference, and auxiliary electrodes, respectively;

FIG. 3 is a graph showing cyclic voltammograms of $K_3Fe(CN)_6$ recorded utilizing platinum wire and platinum coated carbon electrodes; and FIG. 4 is a graph showing cyclic voltammograms of $K_3Fe(CN)_6$ recorded utilizing platinum coated electrode or pure platinum wire as a working electrode.

DETAILED DESCRIPTION OF THE INVENTION

Generally, the present invention provides a method of coating a carbon article with a metal, by cyclic voltammetrically electrodepositing the metal on the carbon article, thereby forming a metal coating on the carbon article. Also provided by the present invention, is the metal-coated carbon article made by the above method.

The term "carbon article" is intended to include all carbon-based., materials. The carbon article must be able to withstand the electrodeposition of a metal coating via cyclic voltammetry. Examples of materials able to withstand this treatment are known to those of skill in the art. The carbon articles can include, but are not limited to, carbon paper, carbon rods, carbon fibers, carbon nanotubes, carbon composite materials, carbon electrodes, and other similar materials.

The term "metal" is used to reference a metal that is capable of being electrodeposited on a carbon article as a very thin coating. More specifically, the metal is preferably a precious metal, as these metals are known to those of skill in the art to be useful as coatings on carbon articles. Examples of such precious metals include, but are not limited to, platinum, gold, silver, palladium, ruthenium, rhodium, and iridium. Preferably, the metal coating is formed utilizing platinum.

Electrodeposition is the electrochemical deposition of metal ions. Electrodeposition allows the "tailoring" of surface properties of a bulk material or, in the case of electroforming, the entire part. Deposits can be produced to meet a variety of designer demands.

The preferred method of electrodeposition utilizes voltammetry. Voltammetry utilizes a simple potential waveform that is often used in electrochemical experiments, which is the linear waveform i.e., the potential is continuously changed as a linear function of time. The rate of change of potential with time is referred to as the scan rate (v). The simplest technique that uses this waveform is linear sweep voltammetry. The potential range is scanned in one direction, starting at the initial potential and finishing at the final potential. A more commonly used variation of the technique is cyclic voltammetry, in which the direction of the potential is reversed at the end of the first scan. Thus, the waveform is usually of the form of an isosceles triangle. The advantage is that the product of the electron transfer reaction that occurred in the forward scan can be probed again in the reverse scan. In addition, it is a powerful tool for the determination of formal redox potentials, detection of chemical reactions that precede or follow the electrochemical reaction, and evaluation of electron transfer kinetics.

More specifically, cyclic voltammetry (CV) is an electrolytic method that uses microelectrodes and an unstirred solution, so that the measured current is limited by analyte diffusion at the electrode surface. The electrode potential is ramped linearly to a more negative potential, and then ramped in reverse back to the starting voltage. The forward scan produces a current peak for any analytes that can be reduced through the range of the potential scan. The current increases as the potential reaches the reduction potential of the analyte, but then falls off as the concentration of the analyte is depleted close to the electrode surface. As the applied potential is reversed, it reaches a potential that reoxidizes the product formed in the first reduction reaction, and produces a current of reverse polarity from the forward scan. The oxidation peak usually has a similar shape to the reduction peak. The peak current, $i_p$, is described by the Randles-Sevcik equation:

$$i_p = (2.69 \times 10^5) n^{3/2} ACD^{1/2} v^{1/2}$$

where n is the number of moles of electrons transferred in the reaction, A is the area of the electrode, C is the analyte concentration (in moles/cm$^3$), D is the diffusion coefficient, and v is the scan rate of the applied potential.

The potential difference between the reduction and oxidation peaks is theoretically 59 mV for a reversible reaction. In practice, the difference is typically 70-100 mV. Larger differences, or nonsymmetric reduction, and oxidation peaks, are an indication of a nonreversible reaction. The parameters of cyclic voltammograms make CV most suitable for characterization and mechanistic studies of redox reactions at electrodes.

The method of the present invention provides for coating a carbon article with a metal using cyclic voltammetric electrodeposition or controlled potential electrodeposition, thereby forming a metal coating on the carbon article. More specifically, the electrodepositing step includes immersing the carbon article in a solution containing a reducible metal compound. The carbon article and the solution are then subjected to varying electrical potentials, the general principle of which is detailed above. For example, the carbon article and the solution are subjected to varying electrical potential from about zero volts to about −1.0 volts with a rate of potential change of about 100 millivolts per second. The subjecting step is then repeated until the metal is formed of a sufficient thickness on a surface of the carbon article. The use of cyclic voltammetry for the electrodeposition of a metal enables an extremely thin coating to be deposited on a carbon article. For example, the metal coating can be deposited of a thickness that is less than about 0.1 mg/cm$^2$ and most preferably less than 0.08 mg/cm2, 0.05 mg/cm$^2$, and 0.03 mg/cm$^2$.

More specifically, the present invention provides an electrochemical technique for uniformly coating platinum metal on carbon surfaces, up to 0.098 mg/cm$^2$. The method utilizes electrochemical reduction of platinum compounds that can be easily reduced at the electrode surfaces. Among the compounds tested, a mixed-valence platinum phosphate blue and tetrachloroplatinate(II) were easily deposited. The impregnation of platinum on the carbon surfaces was accomplished by cyclic voltammetry with scanning voltage, 0 to −1.0 V vs. SCE. The level of coating can be controlled by the number of cycles. At saturation, the platinum coating was found to be 0.098 mg/cm$^2$. Alternatively, the platinum coating can also be accomplished by holding the potential at values more negative than the reduction potentials at various lengths of time. The degree of coating is either dependent on the number of cycles or on the holding/maintaining time. At saturation, 0.098 mg/cm$^2$ platinum was deposited on a porous carbon rod (without stirring the solution). Once the coating had been deposited, the carbon electrode functioned like a platinum electrode. The method can be applied to a variety of carbon surfaces, including carbon fiber used for fuel cell technology.

The method of the present invention can also be used to create electrodes for use in stationary phosphoric acid fuel cells. Additionally, the method of the present invention can be used to create electrodes for use in several types of fuel cells including, but not limited to, solid oxide fuel cells, molten carbonate fuel cells, alkaline fuel cells, and proton exchange membrane fuel cells. The method is beneficial for such fuels cells because platinum coated carbon rods, and fibers, readily reduce oxygen in phosphoric acid and other media. The active platinum surface-areas of these electrodes were determined from the charge accumulation, during the hydrogen underpotential deposition on platinum in 1.0 M sulfuric acid solution. The technique can also be used in other technology, such as electrochemical reactors, catalysis, electroanalyzer, etc. where inert metal surfaces are required.

The method of the present invention utilizes electrochemical reduction of platinum compounds that can be easily reduced at the electrode surfaces. Suitable platinum compounds include a mixed-valence platinum phosphate blue[3,4], and tetrachloroplatinate(II). However, other reducable (reducible) metal compounds can also be used. The impregnation of platinum on the carbon surfaces can be accomplished by cyclic voltammetry with scanning voltage, 0 to −1.0 V vs. saturated calomel electrode (SCE). The level of coating can be controlled by the number of cycles completed. The platinum coating can also be deposited by maintaining the potential at values more negative than the reduction potentials for various lengths of time. The amount of coating is either dependent on the number of cycles or on the holding time. At saturation, 0.098 mg/cm$^2$ platinum was deposited on a porous carbon rod. Once the coating is deposited, the carbon electrode functions as a platinum electrode.

The platinum coated carbon electrode does not lose its properties even when the electrodes are kept in 2.5 M perchloric acid solution over a day. The method can be adapted to fuel cell electrode assemblies with much less platinum loading, by utilizing simple electrochemical devices, and avoiding expensive vapor deposition methodology. Furthermore, unlike the vapor deposition technique, the electrodeposition is carried out in aqueous solution, and therefore, exposure of workers to heavy metal vapor and organic solvents can be avoided.

The present invention also provides an efficient reduction of oxygen at the platinum coated carbon electrodes in phosphoric acid solution, thus indicating that the coated electrodes can be used in phosphoric acid fuel cells. The electrodes can also be used in other fuel cells, based on the observation that the coated electrodes efficiently reduce oxygen in other conditions.

The present invention is beneficial over the prior art because the method of the present invention creates highly active platinum surface areas on the coated carbon article. The activity of the surface area was detected based on charge accumulation on the electrode surface during a cyclic voltammetry experiment in sulfuric acid. The charge accumulation occurs because of hydrogen deposition and hydrogen release on the surface of the coated electrode when the coated electrode was placed in acidic media. Further, the method of the present invention provides a more cost effective manner in which to form electrodes coated with metals.

The method can also be used in other technologies such as electrochemical reactors, catalysis, electroanalyzer etc., where inert metal surfaces are required.

uniform coating of the platinum on the carbon surface was observed following the cyclic voltammetry experiments. However, the effective surface area as determined (data not shown) is much larger than the geometric surface area of carbon articles. Accordingly, the actual platinum loading is lower than the values provided in Table 1 and in some instances the loading can be three times less for carbon articles.

TABLE 1

Coated Platinum Contents on Carbon Surfaces Following Cyclic Voltammetry

| | Platinum Loading mg/cm$^2$ | | | | |
|---|---|---|---|---|---|
| No. Of Cycles | Carbon Rod/ Pt-Blue (Stirring) | Carbon Paper/ Pt-Blue (Stirring) | Carbon Rod/ $K_2PtCl_4$ (Without Stirring) | Carbon Paper/ $K_2PtCl_4$ (Without Stirring) | Carbon Paper/ $K_2PtCl_4$ (Stirring) |
| 05 | 0.0448 | 0.0303 | — | 0.0401 | 0.1146 |
| 08 | 0.0889 | — | — | — | — |
| 10 | 0.1198 | 0.0761 | — | 0.0779 | 0.1838 |
| 15 | 0.1810 | 0.1176 | — | 0.0910 | — |
| 20 | 0.2158 | 0.1452 | 0.0980 | 0.1100 | 0.2058 |

The invention is further described in detail by reference to the following experimental examples. These examples are provided for the purpose of illustration only, and are not intended to be limiting, unless otherwise specified. Thus, the invention should in no way be construed as being limited to the following examples, but rather, should be construed to encompass any and all variations, which become evident as a result of the teaching provided herein.

EXAMPLES

Example 1

A conventional three-electrode electrochemical cell with a carbon rod or carbon cloth as a working electrode, saturated calomel as a reference electrode, and a platinum wire as an auxiliary electrode was designed. These electrodes were immersed in a platinum phosphate blue solution (0.01M) in 0.5M $NaClO_4$ and connected to a computer-interfaced potentiostat/galvanostat (Princeton Applied Research, Model 273). Platinum phosphate blue is a mixed valence oligomeric platinum complex with a basic unit, $Pt_2(NH_3)_2(HPO_4)_2$. The initial potential was set at 0.0 volts (V) and the potential was swept continuously to −1.0 V (forward scan) with a scanning rate of 100 mV/s. The changes in current, as a function of potential, were recorded. Once the potential reached −1.0 V, the sweeping direction was reversed with the same scanning rate.

FIG. 2 shows the cyclic voltammograms recorded by scanning the potential between 0 and −1.0 V for 20 cycles. Each complete cycle consists of a forward and a reverse scan. As can be seen from the diagram, there is a large change in current during the first four cycles. Subsequently, the changes in current from one cycle to the next decrease after several cycles, indicating the completion of electrode modification. In fact, very little change in current is seen after 10 cycles. Although the current did not change significantly after five cycles, platinum loading continues until it reaches saturation, which requires at least about 20 cycles. Amounts of platinum loaded on carbon surfaces, as determined by ion plasma coupled mass spectrometry (ICP-MS), are listed in Table 1. A The extent of platinum deposition also depended on whether the solutions were stirred during the voltammetry experiments. For example, after twenty cycles, platinum loading on carbon rod was found to be 0.098 mg/cm$^2$ without stirring the solution while approximately twice that amount was loaded if the solutions were stirred. The platinum content on the carbon electrodes varies with the number of cycles. For example, platinum loadings on porous carbon electrode with stirring were determined to be 0.0448 mg/cm$^2$ and 0.2158 mg/cm$^2$ with five and twenty successive cycles respectively. Identical experiments with carbon cloth (Torray Carbon Paper, E-Tek Inc) revealed platinum loading between 0.0303 mg/cm$^2$ to 0.1452 mg/cm$^2$ based on the geometric surface area of the carbon articles with five and twenty cycles, respectively.

The platinum coated carbon electrode made according to this method functions like an authentic platinum electrode as evidenced by the following experiments. First, cyclic voltammograms were recorded for the reduction of $K_3Fe(CN)_6$ using a platinum wire and platinum coated carbon electrode as a working electrode. Identical voltammograms were obtained when the surface area of these two electrodes were equal as shown in FIG. 3. Furthermore, when a platinum coated carbon electrode was also used as an auxiliary electrode, the electrochemical system yielded voltammograms similar to those observed for platinum metal auxiliary electrode as shown in FIG. 4.

The efficacy of these platinum coated electrodes was demonstrated by their ability to reduce oxygen in phosphoric acid solution. In these series of experiments, platinum coated electrodes were used as working electrode and Ag/AgCl as the reference electrode for the reduction of oxygen by acquiring cyclic voltammograms of oxygen saturated phosphoric acid. Tremendous enhancement of reduction current was found with platinum coated carbon rods (five, ten, twenty and twenty five cycles of coatings) compared to no reduction of oxygen with bare carbon rod (data not shown). Similar experiments in other conditions also demonstrate efficient reduction of oxygen.

The active surface areas of the platinum coated carbon roads were determined by recording cyclic voltammograms in sulfuric acid by using a hydrogen reference electrode. The accumulation of charge was calculated based on the established procedure described in ref. 5 and using 220 μC/Cm$^2$. The experiments show that when the tip of a carbon rod of 3.1 mm diameter (surface area 0.075 Cm$^2$) was coated with platinum for five cycles, the active platinum surface was found to be 0.2 Cm$^2$ while with ten cycle loading the active area was increased to 0.26 cm$^2$. Taking the ICP-MS platinum estimations reported in Table 1 and combining the estimations with the surface area determined from the cyclic voltammetry measurements, the effective loading can be calculated to be 0.02 mg/Cm$^2$ and 0.035 mg/cm$^2$ for the five- and ten-cycle loading. The data also indicate that a two-fold increase in platinum only afforded 30% increase in surface area. Therefore, a series of low loading platinum electrodes is more efficient in delivering high current density rather than increasing platinum loading.

Other platinum (II) and (IV) compounds including tetrachloroplatinate (II) can also be used as the sources of platinum in electrodeposition. For example, the platinum loading with tetrachloroplatinate (II) as the metal source was found to be 0.0401 mg/cm$^2$ and 0.1100 mg/cm$^2$ on carbon paper based on exposed geometric surface areas, (without stirring) after five cycles and twenty cycles, respectively. As with the platinum phosphate blue, the extent of platinum deposition also depends whether the solution is stirred. For example, platinum loading of 0.11 mg/cm$^2$ was found without stirring after 20 cycles while almost twice the amount of platinum was deposited with stirring the solution. The platinum coating can also be achieved by maintaining the electrode in the solution at potentials further negative to the reduction potential of the platinum compounds. However, to avoid the adsorption of other platinum oxidation states on to the electrode surface, a cyclic scanning can be carried out. The undesired adsorbed species can be removed by oxidation during the reverse scan whereas the constant potential deposition may not remove the undesired adsorbed species.

In conclusion, the method of the present invention provides a metal deposited in an amount that can be carefully controlled to low levels. Typically these levels are less than 0.03 mg/cm$^2$, and may be lower than 0.01 mg/cm$^2$. (Since a complete platinum coating is not required for a fuel cell electrode, the present method is well suited for low platinum loading). The method also produces less platinum waste, thereby decreasing cost associated with the creation of fuel cells or other apparatus utilizing a substrate coated with a precious or other metal. The method also deposits a metal onto a surface without the use of either an organic vapor or a metal vapor, thereby increasing safety in producing such articles.

Throughout this application, author and year and patents by number reference various publications, including United States patents. Full citations. for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

REFERENCES

1. Fuel Cells for Transportation, 2001 Annual Progress Report, U.S. Department of Energy, Office of the Advanced Technology, Washington, D.C.
2. M. W. Ellis, M. R. V. Spakovsky, D. J. Nelson, Proceedings of IEEE, Fuel cell systems: Efficient, flexible energy conversion in the 21st Century, 2001, 89, 1808-1818.
3. R. N. Bose, R. E. Viola and R. D. Cornelius, "Phosphorus-31 NMR Characterization and Kinetics of Formation of Ortho-, Pyro-, and Tri-phosphate Complexes of Platinum (II)", *J. Am. Chem. Soc.,* 1984, 106, 3336-3344.
4. R. N. Bose, R. D. Cornelius and R. E. Viola, "Kinetics and Mechanisms of Platinum(II) Promoted Hydrolysis of Inorganic Polyphosphates", *Inorg. Chem.,* 1985, 24, 3989;
5. H. Angerstein-Kozlowska, B. MacDougall, and B. E. Conway, J. Electroanal. Chem. Interfacial Electrochem., 1972, 39(2), 287-313

What is claimed is:

1. A method of coating a carbon article with platinum comprising:
    contacting the carbon article with a solution comprising platinum phosphate blue and
    performing electrodeposition through cyclic voltammetry, thereby forming a platinum coating on the carbon article.

2. The method according to claim 1, wherein the electrodeposition step includes immersing the carbon article in the solution.

3. The method according to claim 2, wherein the electrodeposition step includes varying electrical potential from about zero volts to about −1.0 volts with a rate of potential change of about 100 millivolts per second.

* * * * *